United States Patent
Katsumata

(10) Patent No.: US 7,464,135 B2
(45) Date of Patent: Dec. 9, 2008

(54) POINT MANAGEMENT SERVER AND POINT MANAGEMENT SYSTEM

(75) Inventor: Chihiro Katsumata, Tokyo (JP)

(73) Assignee: NEC Corporation, Tokyo (JP)

( * ) Notice: Subject to any disclaimer, the term of this patent is extended or adjusted under 35 U.S.C. 154(b) by 582 days.

(21) Appl. No.: 10/930,907

(22) Filed: Sep. 1, 2004

(65) Prior Publication Data

US 2005/0050177 A1 Mar. 3, 2005

(30) Foreign Application Priority Data

Sep. 2, 2003 (JP) ............................. 2003-310234

(51) Int. Cl.
G06F 15/16 (2006.01)
(52) U.S. Cl. .................... 709/203; 709/219; 709/223; 705/14; 725/23
(58) Field of Classification Search ................ 709/203, 709/217, 219, 223; 705/14; 725/22, 23
See application file for complete search history.

(56) References Cited

U.S. PATENT DOCUMENTS

| 6,381,632 | B1 | 4/2002 | Lowell | |
|---|---|---|---|---|
| 6,425,131 | B2 * | 7/2002 | Crandall et al. | 725/106 |
| 6,553,376 | B1 * | 4/2003 | Lewis et al. | 707/10 |
| 2001/0003523 | A1 * | 6/2001 | Crandall et al. | 370/352 |
| 2002/0032906 | A1 * | 3/2002 | Grossman | 725/42 |
| 2002/0073430 | A1 * | 6/2002 | Crandall et al. | 725/105 |
| 2002/0107735 | A1 * | 8/2002 | Henkin et al. | 705/14 |
| 2002/0116266 | A1 * | 8/2002 | Marshall | 705/14 |
| 2002/0120501 | A1 | 8/2002 | Bell et al. | |
| 2002/0120505 | A1 * | 8/2002 | Henkin et al. | 705/14 |
| 2003/0139997 | A1 * | 7/2003 | Ginsberg | 705/37 |
| 2003/0172376 | A1 * | 9/2003 | Coffin, III | 725/22 |
| 2003/0212756 | A1 * | 11/2003 | Kuroda | 709/217 |

FOREIGN PATENT DOCUMENTS

| JP | 2002-207599 A | 7/2002 |
|---|---|---|
| JP | 2002-245263 A | 8/2002 |
| WO | WO 01/31599 A1 | 5/2001 |
| WO | WO 01/38993 A1 | 5/2001 |

* cited by examiner

Primary Examiner—Oanh Duong
(74) Attorney, Agent, or Firm—Sughrue Mion, PLLC

(57) ABSTRACT

A point management server comprising transmission/reception means (33) for receiving a download request from a user's communication terminal, download authorization means (32) for authorizing the communication terminal to carry out a download from a contents server, point addition means (30) for adding points when the communication terminal has completed the download, point management means (31) for managing the points added by the point addition means and the number of times of use by the user, and log creation means (34) for creating requester's information from the request received from the communication terminal.

18 Claims, 5 Drawing Sheets

FIG. 4

| FROM 2 A.M. | FROM 4 A.M. | FROM 6 A.M. | FROM 8 A.M. | FROM 10 A.M. | FROM 12 P.M. | FROM 2 P.M. | FROM 4 P.M. | FROM 6 P.M. | FROM 8 P.M. | FROM 10 P.M. | FROM 12 A.M. |
|---|---|---|---|---|---|---|---|---|---|---|---|
| 3 | 4 | 5 | 20 | 20 | 10 | 8 | 8 | 8 | 7 | 3 | 3 |

FIG. 5

| | FROM 2 A.M. | FROM 4 A.M. | FROM 6 A.M. | FROM 8 A.M. | FROM 10 A.M. | FROM 12 P.M. | FROM 2 P.M. | FROM 4 P.M. | FROM 6 P.M. | FROM 8 P.M. | FROM 10 P.M. | FROM 12 A.M. |
|---|---|---|---|---|---|---|---|---|---|---|---|---|
| NEWS | 10 | 10 | 3 | 3 | 4 | 3 | 10 | 8 | 3 | 3 | 3 | 3 |
| GAMES | 3 | 4 | 6 | 8 | 10 | 8 | 6 | 5 | 4 | 3 | 3 | 3 |
| MUSIC | 3 | 3 | 10 | 10 | 10 | 8 | 10 | 10 | 10 | 8 | 3 | 3 |
| IMAGES | 3 | 4 | 10 | 10 | 10 | 8 | 10 | 10 | 10 | 8 | 3 | 3 |

| | FROM 2 A.M. | FROM 4 A.M. | FROM 6 A.M. | FROM 8 A.M. | FROM 10 A.M. | FROM 12 P.M. | FROM 2 P.M. | FROM 4 P.M. | FROM 6 P.M. | FROM 8 P.M. | FROM 10 P.M. | FROM 12 A.M. |
|---|---|---|---|---|---|---|---|---|---|---|---|---|
| 1 TO 20 TIMES | 3 | 3 | 5 | 5 | 6 | 7 | 8 | 10 | 8 | 5 | 3 | 3 |
| 21 TO 30 TIMES | 6 | 6 | 10 | 10 | 12 | 14 | 16 | 20 | 16 | 10 | 6 | 6 |
| FROM 31 TIMES | 9 | 9 | 15 | 15 | 18 | 21 | 24 | 30 | 24 | 15 | 9 | 9 |

FIG. 6

| | FROM 2 A.M. | FROM 4 A.M. | FROM 6 A.M. | FROM 8 A.M. | FROM 10 A.M. | FROM 12 P.M. | FROM 2 P.M. | FROM 4 P.M. | FROM 6 P.M. | FROM 8 P.M. | FROM 10 P.M. | FROM 12 A.M. |
|---|---|---|---|---|---|---|---|---|---|---|---|---|
| SUN | 5 | 5 | 5 | 5 | 6 | 7 | 8 | 10 | 8 | 5 | 3 | 3 |
| MON | 3 | 6 | 7 | 8 | 10 | 10 | 10 | 10 | 8 | 5 | 3 | 3 |
| TUE | 3 | 6 | 7 | 8 | 10 | 10 | 10 | 10 | 8 | 5 | 3 | 3 |
| WED | 3 | 6 | 7 | 8 | 10 | 10 | 10 | 10 | 8 | 5 | 3 | 3 |
| THU | 3 | 6 | 7 | 8 | 10 | 10 | 10 | 10 | 8 | 5 | 3 | 3 |
| FRI | 3 | 6 | 7 | 8 | 10 | 10 | 10 | 10 | 3 | 3 | 2 | 2 |
| SAT | 2 | 3 | 5 | 5 | 5 | 5 | 5 | 5 | 5 | 5 | 5 | 5 |

FIG. 7

POINT MANAGEMENT SERVER AND POINT MANAGEMENT SYSTEM

BACKGROUND OF THE INVENTION

The present invention relates to a point management server which gives rewards to users in order to expedite the download of Internet-based programs.

Various Internet businesses are being put to practical use by using a free network environment like the Internet. Especially, the download of modifier files for carrying out the modification of software (refer to publication of patent applications No. 2002-207599, JP) and download services for games, music, images, and the like (refer to publication of patent applications No. 2002-245263, JP) are increasing. For example, when downloading music files, a browser is activated, connection is made to a site providing the music, and the music files may be downloaded. Also, when downloading takes place, a lot of downloading services give to the user a fixed set of points or rewards according to use.

Furthermore, as long as the providers of Internet business services operate their sites 24 hours a day, users can carry out downloads anytime. However, the time period of highest Internet use is actually from 10 p.m. to 3 a.m. Accordingly, the use of downloading services in this time period is also high. For this reason, the access of many users becomes concentrated in a specific time period.

Conventional technology gave no thought to the traffic situation of networks and contents servers being used. For this reason, the use of users becomes concentrated for a specific time. When the downloads of many users become concentrated at a given time, access concentration exceeds the upper limit of that service. Therefore, the processing ability of the server providing the download service is exceeded. This exceeding of the processing ability of the server has been a cause of communication failure.

SUMMARY OF THE INVENTION

An object of the present invention is to avoid concentration of access to a network and contents server by encouraging the user's request timing of a download to be done in an uncrowded time period of the network and contents server, according to the traffic situation of the network being used.

In order to solve the above-mentioned problem, the present invention has a point management server which receives requests from the user's communication terminal via an information network, instructs the communication terminal on the whereabouts of the download server, and performs the addition of the user's service use points, as well as a contents server in which the contents are managed.

The point management server of the present invention comprises point addition means for adding the user's points, point management means for managing those points, a point storage memory for saving the user's information in the point management means, transmission/reception means for receiving requests from a communication terminal, log creation means for creating a log from the information received, a clock for determining the time of reception of the request from the communication terminal, a log memory for saving the log, download instruction means for giving an instruction of a download to the contents server using the transmission/ reception means, a point addition classification table for determining the user's number of additional points, and a controller for controlling the server.

BRIEF DESCRIPTION OF THE DRAWINGS

FIG. 4 is a table showing an example of a point addition classification table of a point management system according to a first embodiment of the present invention.

FIG. 5 is a table showing an example of a point addition classification table of a point management system according to a second embodiment of the present invention.

FIG. 6 is a table showing an example of a point addition classification table of a point management system according to a third embodiment of the present invention.

FIG. 7 is a table showing an example of a point addition classification table of a point management system according to a fourth embodiment of the present invention.

DESCRIPTION OF THE PREFERRED EMBODIMENTS

Figure 1:
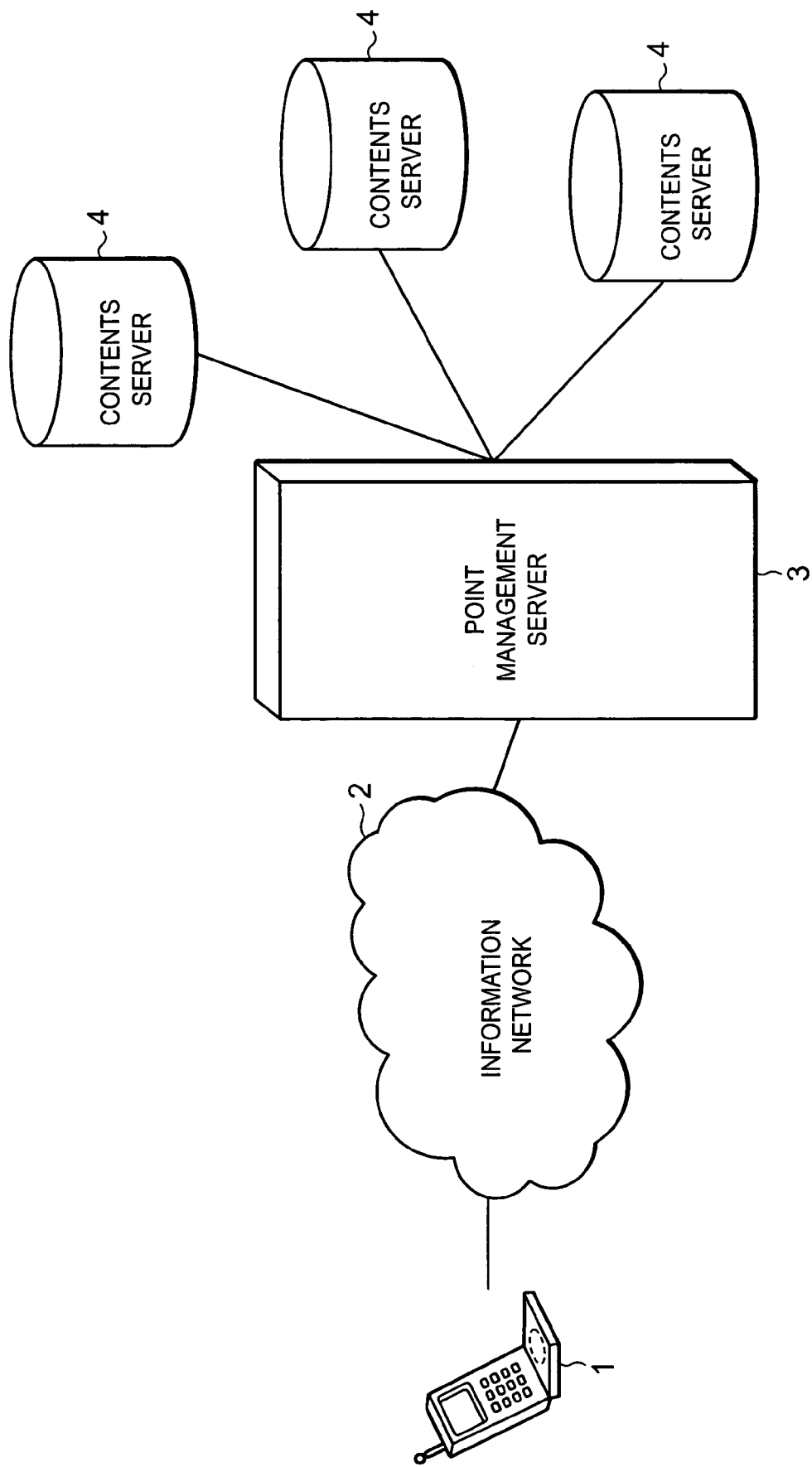
FIG. 1 is a block diagram showing a configuration of a point management system according to the present invention.

A first embodiment of the present invention will be explained using the drawings. Referring to FIG. 1, there is shown a block diagram of a system configuration according to the first embodiment of the present invention. The point management system of the present invention comprises a mobile phone terminal 1, which is an example of a communication terminal used by a user, an information network 2, which the mobile phone terminal 1 is connected to, a point management server 3, which receives requests from the mobile telephone terminal 1 via an information network, and respective contents servers 4 in which the contents are managed.

Figure 2:
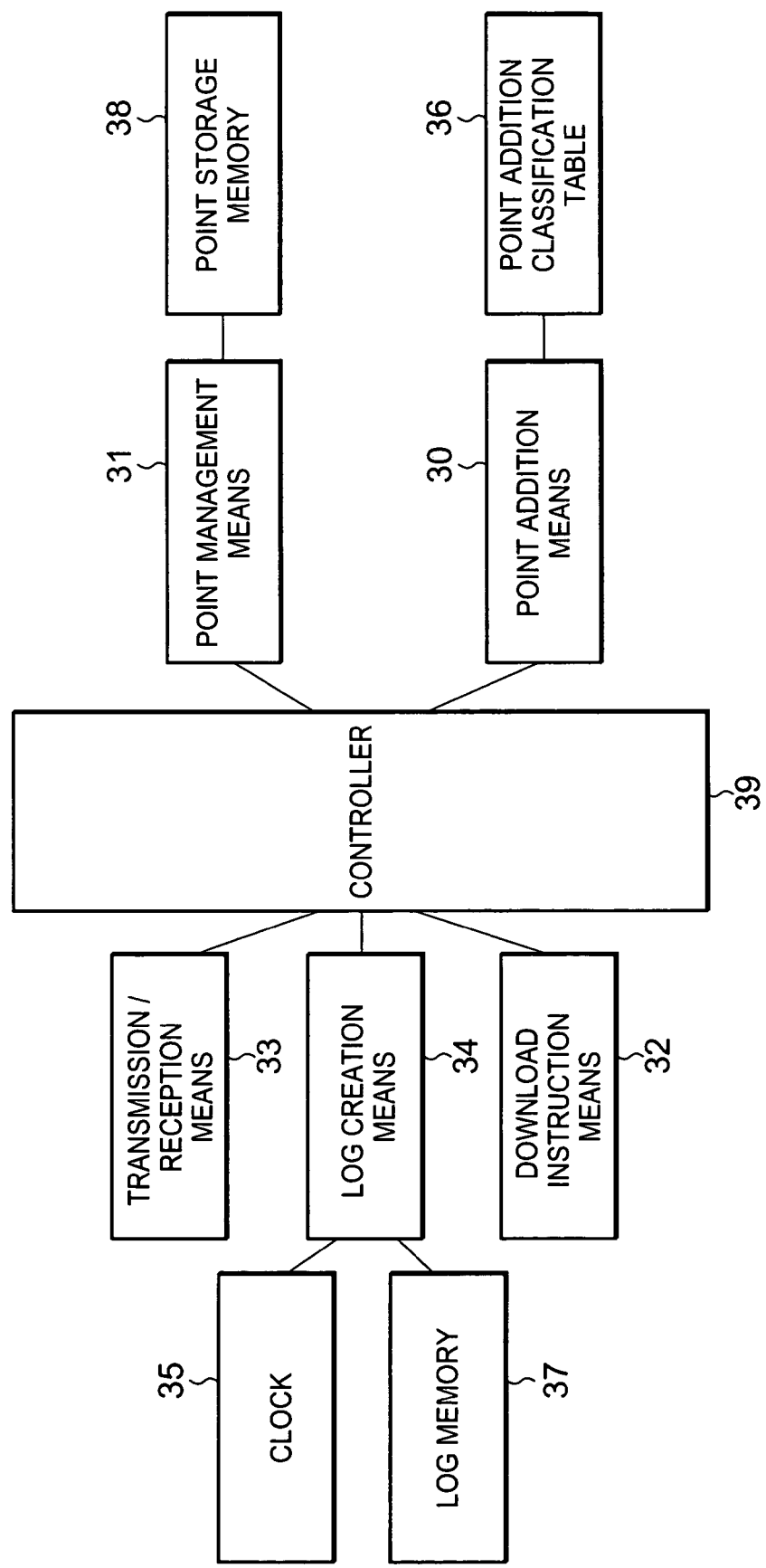
FIG. 2 is a block diagram showing a configuration of a point management server according to the present invention.

FIG. 2 is a block diagram showing the internal construction of the point management server 3. The point management server 3 has point addition means 30 for adding the user's points, point management means 31 for managing those points, a point storage memory 38 for saving the user's information in the point management means 31, transmission/ reception means 33 for receiving requests from the mobile phone terminal 1, log creation means 34 for creating a log from the information received, a clock 35 for determining the time of reception of the request from the mobile phone terminal 1, a log memory 37 for saving the log, download instruction means 32 for giving an instruction of a download to the contents server using the transmission/reception means 33, a point addition classification table 36 for determining the user's number of additional points, and a controller 39 for controlling the whole processing flow of the server.

Figure 3:
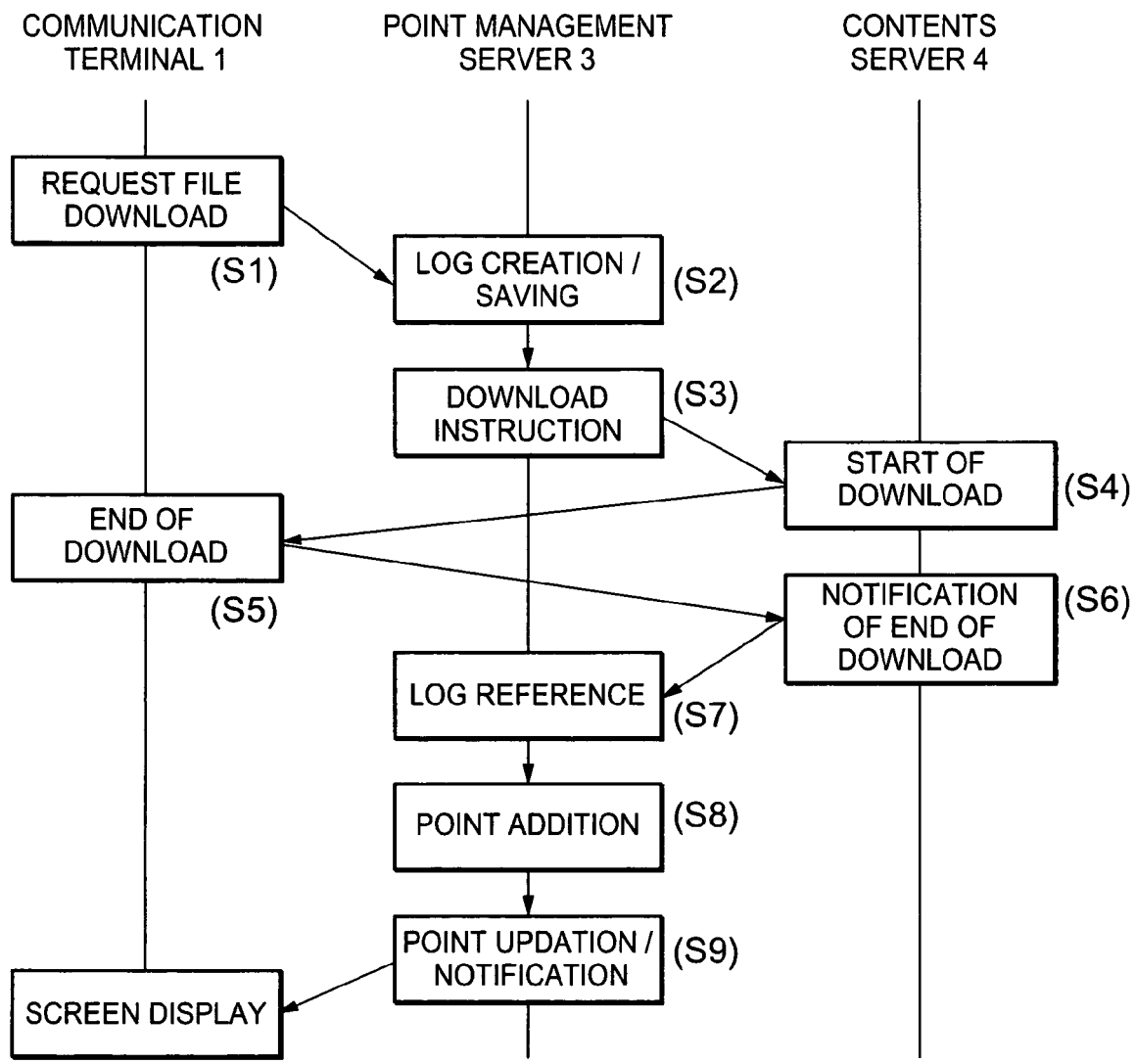
FIG. 3 is a flowchart showing the steps of a point management system according to the present invention.

FIG. 3 is a flowchart showing a process of the first embodiment of the present invention. When the point management server 3 receives a request for the download of a chosen file from the mobile phone terminal 1 (S1), the log creation means 34 creates a log of the requester's name, as well as the date and time of the request obtained from the clock 35, as requester's information of the request and saves the created log in a log memory 37 (S2). When a log is created, an instruction is sent from the download instruction means 32 to a predetermined contents server 4 in order to start the download to the mobile phone terminal 1 from which the request was received (S3).

The contents server 4 receives the download instruction from the point management server 3, and the download to the mobile phone terminal 1 starts (S4). When the download to the mobile phone terminal 1 has been completed, the mobile phone terminal 1 notifies the contents server 4 that the download has finished (S5). Upon receiving the notification of the end of the download from the mobile phone terminal 1, the contents server 4 notifies the point management server 3 that the download has finished (S6). The memory of the point management server 3 is searched for the log created when the request was made for the download, and the date and time are extracted from the requester's information registered in the log.

The requester's information may be the requester's name, date and time, the name of the downloaded file, the kind of downloaded file, the number of times the service has been used, and the like.

FIG. 4 is a table showing an example of a point addition classification table 36. The point management server 3 makes an inquiry to the point addition classification table 36, which is in the server, about the requester's information (S7). For example, when a request for a file is made on August 1 at 5:54 p.m., the time of the request is 5:54 p.m., and looking at FIG. 4 the number of points corresponding to this time is 8. Therefore, 8 points will be added. The number of the user's points up until the previous download are retrieved from the point storage memory 38, and 8 points are added to the number of user's points up until the previous download (S8). When the user's number of points and number of times of use are updated, the transmission/reception means of the point management server 3 notifies the user of the mobile phone terminal 1 by e-mail or the like so the user can confirm the latest number of points by display on the screen of the mobile phone terminal 1 (S9).

The number of points in the point addition classification table 36 of FIG. 4 is matched with the crowding situation of a general information network. In other words, the number of points is set low for a time period when the information network is crowded, and the number of points is set high for a time period when the information network is uncrowded. Users who want to earn a lot of points will be attracted to the time periods that are not crowded, and as a result it is possible to regulate the number of users.

Preferably the controller 39 of FIG. 2 decides the number of points from the traffic situation of the information network 2 and varies the number of the points of the point addition classification table 36. Also, the controller 39 may request information about the traffic of a network being used from a telecommunications carrier (NTT or the like), and when the traffic of the network exceeds a fixed number, the controller 39 may vary the number of points.

FIG. 5 is a table showing an example of the point classification table 36 in the point management system 3 of a second embodiment. An explanation about the structure of the second embodiment has been omitted since it is the same as the structure of the first embodiment in FIG. 1, FIG. 2, and FIG. 3.

As shown in FIG. 5, the predetermined number of points in the point addition classification table 36 is set according to the time and the type of file to be downloaded. In the second embodiment the type of file to be downloaded is decided by the controller 39. When access to the contents server 4 exceeds a fixed number, it is preferred to make setting in such a way that the contents server 4 notifies the point management server 3 that access has exceeded a fixed number. Furthermore, when the point management server 3 receives from the contents server 4 notification that it has already been accessed a fixed number of times, it is preferred that the value of the number of points on the point addition classification table 36 of FIG. 5 are automatically altered.

FIG. 6 is a table showing an example of the point addition classification table 36 in the point management server 3 of a third embodiment. An explanation about the structure of the third embodiment has been omitted since it is the same as the structure of the first embodiment in FIG. 1, FIG. 2, and FIG. 3.

As shown in FIG. 6, the predetermined number of points in the point addition classification table 36 is set according to the time and the number of times of use of the service by the user. The number of times of use by the user is each saved in the point storage memory 38. Therefore, from the requester's name the number of times of use of the service are retrieved from the point storage memory 38 and based on this point referencing is carried out.

FIG. 7 is a table showing an example of the point addition classification table 36 in the point management server 3 of a fourth embodiment. An explanation about the structure of the fourth embodiment has been omitted since it is the same as the structure of the first embodiment in FIG. 1, FIG. 2, and FIG. 3.

As shown in FIG. 7, the predetermined number of points in the point addition classification table 36 is set according to the day of the week and time. Point referencing is performed from the day of the week and time of use by the user in the fourth embodiment since generally the time period of use by the user varies according to weekdays or weekends.

Also, the service provider may alter the number of points in the point addition classification table 36 by the bargaining of a lot of categories, such as the type of mobile terminal or the base station of the mobile terminal.

According to the present invention, the provider of services freely sets the number of points in the point addition classification table provided in the point management server, by which it can prevent access concentration to the contents server and network, as well as prevent communication failure of the information network from occurring.

What is claimed is:

1. A point management server, wherein a user can gain rewards by downloading software from a contents server via an information network from a communication terminal, the point management server comprising:

a transmission/reception means for receiving a download request of a user from said communication terminal;

a download authorization means for authorizing a download from said contents server to said communication terminal;

a point addition means for adding points if said communication terminal has completed the download;

a point management means for managing the points added by said point addition means and a number of times of use of the contents server by the user; and a log creation means for creating information of the user from the download request received from said communication terminal, wherein said point addition means determines a number of additional points gained by the user on the basis of the information of the user obtained by said log creation means, with reference to a point addition classification table which has a number of points registered according to a time of day, and wherein the number of points registered in said point addition classification table is changed by a service provider according to a type of said communication terminal.

2. The point management server according to claim 1, wherein the information of the user includes at least one of a date and time or a day of the week requested from said communication terminal, a file name of a desired file to be downloaded, and a base station area name the user is using.

3. The point management server according to claim 1, wherein said download authorization means instructs said communication terminal on a location of the desired file to be downloaded.

4. The point management server according to claim 1, wherein said point management means is provided with a point storage memory for storing a name of the user, the number of times of use of the contents server by the user, and a number of points of the user.

5. The point management server according to claim 4, wherein said point management means adds the number of additional points determined by said point addition means to the number of points of the user stored in said point storage memory and adds 1 to the number of times of use stored in said point storage memory.

6. The point management server according to claim 4 or claim 5, wherein said point management means displays updated information on a screen of said communication terminal.

7. The point management server according to claim 1, wherein the points registered in said point addition classification table are changed according to operational situations of said contents server and network.

8. The point management server according to claim 1, wherein the points registered in said point addition classification table are changed according to an operational situation of said information network.

9. The point management server according to claim 1, wherein the points registered in said point addition classification table are changed according to the number of times of use of the contents server.

10. A point management system using a point management server so a user can gain rewards by downloading software from a contents server via an information network from a communication terminal, said point management server comprising:

a transmission/reception means for receiving a download request of a user from said communication terminal;

a download authorization means for authorizing a download from said contents server to said communication terminal;

a point addition means for adding points when said communication terminal has completed the download;

a point management means for managing the points added by said addition means;

a log creator means for creating information of the user from the download request received from said communication terminal; and wherein said point addition means determines a number of additional points gained by the user on the basis of the information of the user obtained by said log creator means and by referring to a point addition classification table containing a number of points according to time of day, and wherein the number of points in said point addition classification table is changed by a service provider according to a type of said communication terminal.

11. The point management system according to claim 10, wherein the information of the user includes at least one of a date and time or a day of the week requested from said communication terminal, a file name of a desired file to be downloaded, and a base station area name the user is using.

12. The point management system according to claim 10, wherein said download authorization means instructs said communication terminal on a location of the desired file to be downloaded.

13. The point management system according to claim 10, wherein said point management means is provided with a point storage memory for storing a name of the user, a number of times of use of the contents server by the user, and a number of points of the user.

14. The point management system according to claim 13, wherein said point management means adds the number of additional points determined by said point addition means to the number of points of the user stored in said point storage memory and adds 1 to the number of times of use stored in said point storage memory.

15. The point management system according to claim 13 or claim 14, wherein said point management means displays updated information on a screen of said communication terminal.

16. The point management system according to claim 10, wherein the number of points in said point addition classification table are changed according to an operational situation of said contents server.

17. The point management system according to claim 10, wherein the number of points in said point addition classification table are changed the according to an operational situation of an information network.

18. The point management system according to claim 10, wherein the number of points in said point addition classification table are changed according to the number of times of use.

\* \* \* \* \*